United States Patent [19]

Shibata et al.

[11] Patent Number: 5,444,802
[45] Date of Patent: Aug. 22, 1995

[54] OPTICAL SWITCH

[75] Inventors: Yasuo Shibata, Zama; Masahiro Ikeda, Fukuyama, both of Japan

[73] Assignee: Nippon Telegraph & Telephone Corporation, Tokyo, Japan

[21] Appl. No.: 341,929

[22] Filed: Nov. 16, 1994

Related U.S. Application Data

[63] Continuation of Ser. No. 91,206, Jul. 14, 1993, abandoned.

[30] Foreign Application Priority Data

Jul. 15, 1992 [JP] Japan .................. 4-188065

[51] Int. Cl.⁶ .................................. G02B 6/00
[52] U.S. Cl. .................................. 385/16
[58] Field of Search .................. 385/16, 17, 2–4, 385/8, 10, 31, 37

[56] References Cited

U.S. PATENT DOCUMENTS

| | | | |
|---|---|---|---|
| 3,804,489 | 4/1974 | Li et al. | 385/2 |
| 4,210,803 | 7/1980 | Ih | 372/20 |
| 4,679,901 | 7/1987 | Dammann et al. | 385/17 X |
| 5,157,537 | 10/1992 | Rosenblatt | 385/37 |
| 5,255,332 | 10/1993 | Welch et al. | 385/17 |

FOREIGN PATENT DOCUMENTS 1-182833  7/1989  Japan .
4-208920  7/1992  Japan .
4-320219  11/1992 Japan .

OTHER PUBLICATIONS

OQE90-153, Y. Shibata et al., "Optically-controlled Grating Optical Switch (OG-SW)", pp. 31-35, Mar. 12th, 1991.

C-469, Y. Shibata et al., "Proposal of All-optical Grating Switches", pp. 102-105, 1989.

Springer Series in Electronics and Photonics, vol. 29, "All-Optical Multiple Quantum Well Grating Switch", Y. Shibata et al., pp. 102-105, 1990.

Optical Fiber Communication Conference, 1992, Tuesday Morning/OFC'92, p. 15, "TuC5 Optical Demultiplexing Of Terabit Packets Using a Nonlinear Waveguide Grating Coupler", M. Haner et al.

Electronics Letters, 31st, Jan., 1991, vol. 27, No. 3 pp. 246-247, "Optically-Controlled Grating Switch (OG-SW)", Y. Shibata et al.

Appl. Phys. Lett., vol. 53, No. 19, Nov. 7, 1988, pp. 1791-1793, "Picosecond All-Optical Switching In Single-Mode GaAs/AlGaAs Strip-Loaded Nonlinear Directional Couplers", R. Jin et al.

Appl. Phys. Lett., vol. 46, No. 1, Jan. 1, 1985, pp. 70-72, "One-Picosecond Optical NOR Gate At Room Temperature With a GaAs-AlGaAs Multiple-Quantum-Well Nonlinear Fabry-Perot Etalon", A. Migus et al.

Electronic Letters, vol. 27, No. 3, Jan. 1991, Stevenage GB, pp. 246-247, Y. Shibata et al., "Optically Controlled Grating Switch (OG-SW)".

Electronics Letters, vol. 26, No. 18, Aug. 1990, Stevenage GB, pp. 1459-1460, S. Larochelle et al. "All-Optical Switching of Grating Transmission Using Cross-Phase Modulation in Optical Fibres".

Optics Communications, vol. 92, No. 4-6, Sep. 1992, Amsterdam NL, pp. 233-239, J. Lauzon et al. "Numerical Analysis of All-Optical Switching of a Fiber Bragg Grating Induced by a Short-Detuned Pump Pulse".

*Primary Examiner*—Akm E. Ullah
*Attorney, Agent, or Firm*—Spencer, Frank & Schneider

[57] ABSTRACT

A grating optical switch has at least one switch region for ON-OFF switch control of a signal light transmission and a signal light reflection, at least one input/output optical waveguide region for guiding the signal light to the switch, at least one coupler region for coupling the control light colinearly to the signal light and for guiding the control light to the switch region together with the signal light, and at least one separator region for separating the signal light and the control light. The switch region transmits the signal light when the control light is coupled while reflecting the signal light when the control light is not coupled.

12 Claims, 13 Drawing Sheets

OPTICAL SWITCH

This application is a Continuation, of application Ser. No 08/091,206 now abandoned, Filed Jul. 14, 1993.

BACKGROUND OF THE INVENTION

1. Field of the Invention

The present invention relates to optical switches to be used in communication systems based on the propagation of light within waveguides, and especially relates to an optically-controlled grating optical switch in which an ON-OFF of signal light is controlled by a control light.

2. Description of the Related Art

Heretofore, optically-controlled optical switches have been regarded as important devices for realizing all-optical signal processing systems and ultra-high speed optical switching systems. Because of its marked characteristics of a large optical non-linearity of a multiple quantum well (MQW), the applicability of a semiconductor laser as a light source and others, an optical switch using a MQW structure of III-V group compound semiconductor has been investigated and developed as one of the most useful optical switches, and hence some types thereof have been reported. For example a plate Fabry-Perot etalon is disclosed by A. Miqus et al., Appl. Phys. Lett. 46, 70, 1985, and a waveguide grating coupler is disclosed by R. Jin et al., Appl. Phys. Lett. 53, 1791, 1988. In particular, an optically-controlled grating switch (OG-SW) has attracted special interest for its excellent switching properties (Japanese Patent Application Laying-open No. 182833/1989).

One example of the conventional optically-controlled grating switch will be explained by the following description referring to the accompanied drawings FIGS. 1-5.

FIG. 1 is a schematic perspective view for demonstrating a typical structure of the conventional optical switch, while FIG. 2 shows its plan view. As shown in these figures, the OG-SW includes an input/output optical waveguide(s) for signal light 1 (1A and 1B, respectively), a grating switch region 2 which is responsible for switching a signal light transmission and a signal light reflection, a control light optical waveguide 3, an InP cladding 4, and an InP substrate 5.

FIGS. 3, 4 and 5 are cross sectional views along lines A-A', B-B' and C-C' in FIGS. 1 and 2, respectively. The input/output optical waveguides 1A and 1B are constructed of cores which are made of $In_{0.72}Ga_{0.28}As_{0.59}P_{0.41}$. The grating 2 is constructed of an optical nonlinear medium having a multiple quantum well structure and its inner structure is composed of quantum well layers 6 and barrier layers 7. The quantum well layer 6 consists of a 50 Å thick layer of $In_{0.47}Ga_{0.53}As$, while the barrier layer 7 consists of a 75 Å thick InP layer.

The band gap wavelength $\lambda_g$ of the multiple quantum well structure takes a value of 1.50 μm. This bandgap wavelength is defined as an absorption band wavelength $\lambda_g$ which is fixed by the bandgap of the semiconductor. In the case that an incident light wavelength $\lambda$ is shorter than the absorption band wavelength $\lambda_g$ (i.e., $\lambda < \lambda_g$), the incident light is absorbed. In the case that the incident light $\lambda$ is longer than the absorption band wavelength $\lambda_g$ (i.e., $\lambda > \lambda_g$), on the other hand, the incident light is transmitted. This optical switch is constructed so that an optical axis of the grating 2 is coincident with that of the core 1. The optical axis is defined as a direction of the propagation along a Z axis which is perpendicular to an X axis and a Y axis (these axes are fixed in the three-dimensional space as shown in FIG. 1). The control light optical waveguide 3 is formed as a core which is made of $In_{0.72}Ga_{0.28}As_{0.59}P_{0.41}$ and is embedded in the cladding layer 4 as shown in FIG. 4. The construction of the control light optical waveguide 3 is similar to that shown in FIG. 3. In the conventional optical switch, as shown in FIG. 2, the input/output optical waveguide 1 and the control light optical waveguide 3 are positioned such that they perpendicularly intersect each other and thus the signal light and the control light are injected into the grating 2 from the directions which perpendicularly intersect each other.

Next, a switching action of the conventional optical switch constructed as described above will be explained. In this case, the switching action using a signal light wavelength of 1.55 μm which is also used in the examples of the present invention, will be described for the purpose of making an easy comparison with the present invention.

The pitch or the like of the grating 2 is determined by a wavelength band of the signal light which is defined as the Bragg wavelength $\lambda_B$. In the case of using $\lambda_B = 1.55$ μm, for example, the grating should be constructed as a first-order diffraction grating to perfectly reflect the light at a wavelength of 1.55 μm, but to transmit the light at a wavelength in the neighborhood of 1.55 μm. There is a certain relationship between the Bragg wavelength $\lambda_B$ and a pitch $\Lambda$ of the grating. As in a correspondence with the Bragg wavelength $\lambda_B = 1.55$ μm, a pitch and a thickness of the grating in the conventional example are fixed at values of 0.24 μm and 0.34 μm, respectively. Reflection coupling coefficient $\kappa$ is defined by a degree of periodical changes of a refractive index and a percentage of confinement of the light in the region where the refractive index changes periodically, and also it indicates a degree of coupling between a forward wave (incident light) and a backward wave (reflected light). Therefore, the refractive indices of the optical nonlinear medium 6 and the cladding 5 are 3.4 and 3.2, respectively, so that the $\kappa$ value takes about 300 $cm^{-1}$ or more when the grating 2 is formed to have 0.15 μm depth, and also the light can be reflected almost perfectly (about 99%) when the grating 2 is formed to have 100 μm length ($L_g$).

FIG. 6 shows a calculated wavelength-reflectance characteristics of the grating 2. The grating 2 is constructed to have a reflectance profile as indicated by a curve A having a peak value at a wavelength corresponding to the signal light wavelength, $\lambda_S = 1.55$ μm. Therefore, the Bragg wavelength $\lambda_B$ of the grating 2 corresponds to the signal light wavelength $\lambda_S$. When the control light at a certain wavelength $\lambda_C$ is incident upon the grating 2, the Bragg wavelength is shifted $\Delta\lambda$ from the signal light wavelength $\lambda_S$ as indicated by a curve B such that the reflectance takes a value of zero at the signal light wavelength $\lambda_S$. As the result, the signal light passes through the grating.

The shift of the Bragg wavelength is dependent on the excitation of carriers in the optical nonlinear medium 6 by injecting the control light into the grating 2. In this case, a very high speed switching can be attained because transition from the initial state of the switch is determined by an interband transition time of the carriers in the multiple quantum well structure.

As described above, the conventional optically-controlled grating optical switch is constructed by the semiconductor medium having a quantum well structure in which the control light is injected from a direction perpendicular to the input/output optical waveguide. Therefore, the advantages of the conventional switch are as follows:

(i) as the conventional switch is constructed, as in the type of a waveguide structure, it is possible to integrate and miniaturize;

(ii) as the conventional switch is constructed, as in the type of a waveguide structure, the switching operation can be performed by low switching power;

(iii) as the signal light passes along a direction perpendicular to the control light, there is no unexpected results caused by the interaction between them and thus there is no need to use an optical isolator and the like;

(iv) signal light and control light at a certain wavelength can be optionally selected, so that the switch can be easily constructed and performs with a high efficiency; and (v) there is no need to modify the construction of the optical switch to provide a gate-type optical switch, a bistable memory, a device with a function of waveform-reconstruction or with other highly functions and the like.

In spite of these advantages, however, the conventional optical switch requires a switching speed of at least 10 nanoseconds for recovering the initial condition because the switching operation is restricted by a life time of the carriers in the multiple quantum well structure. The switching speed of such order is not sufficient to satisfy the requirement of the fast switching action.

To solve the problem concerning about the switching speed which the conventional optical switch does not solve, a modified optically-controlled grating switch have been proposed in Japanese Patent Application Laid-open No. 208920/1992. In this reference, an optical switch having a switching speed of about 1 nanosecond can be provided by constructing the optical switch to have a grating with a reflection coupling coefficient $\kappa$ of 500 cm$^{-1}$ or an impurity concentration of over $5 \times 10^{17}$ cm$^{-3}$ in the multiple quantum well structure. In spite of such modification, however, the switching speed is still not remarkably decreased and thus fast switching is not satisfied. Further improvements for obtaining the higher switching speed have been required. In addition, the conventional optical switch comprises a switching region having an absorption coefficient of 50–100 cm$^{-1}$ with respect to the signal light while an absorption loss of 3–6 dB, because the signal light incidence is obliged to perform at a wavelength in the neighborhood of the a bandgap wavelength of the multiple quantum well structure.

Accordingly, the novel optically-controlled grating switch having properties of an extremely higher switching speed and a lower absorption loss compared with the conventional switch has been demanded.

SUMMARY OF THE INVENTION

It is therefore an object of the present invention, in view of the above problems, to provide optical switches that can achieve a high speed switching operation with low absorption loss of the signal light.

In the first aspect of the present invention, an optical grating switch for an ON-OFF switch control of a signal light transmission and a signal light reflection by means of control light comprises:

a switching region for the ON-OFF switch control by which the signal light transmission and the signal light reflection are switched;

an input/output optical waveguide region for guiding the signal light to the switching region and for outputting the signal light from the switch region;

a coupler region for coupling the control light colinearly to the signal light and for guiding the control light to the switch region together with the signal light;

a separator region for separating the signal light and the control light.

The switch region may be a grating switch of a nonresonant medium without an ability for absorbing the control light.

The nonresonant medium may be a semiconductor selected from a group of consisting III-V group compounds and II-VI group compounds.

The semiconductor may be selected from a group consisting of GaAs series semiconductors and InP series semiconductors.

The switch region may be a grating switch of a medium with an ability for absorbing the control light.

The medium with an ability for absorbing the control light may be selected from a group of consisting III-V group compound semiconductor multiple quantum well structures and II-VI group compound semiconductor multiple quantum well structures.

At least one of the coupler region and the separator region may be a directional coupler.

At least one of the coupler region and the separator region may be a grating coupler.

The switch region, the input/output optical waveguide region, the coupler region and the separator region may be formed in a structure of a ridged waveguide formed on a same substrate, respectively.

The switch region, the input/output optical waveguide region, the coupler region and the separator region may be formed in a structure of an embedded waveguide formed on a same substrate, respectively.

An optical switch may further comprise:

another switching region for switching the signal light;

another input/output optical waveguide region connected to the separator region and the another switch region;

another coupler region for coupling another control light colinearly to the signal light and for guiding the another control light to the another switch region together with the signal light and another separator region for separating the signal light and the another control light.

In a second aspect of the present invention, an optical switch for ON-OFF switch control of a signal light transmission and a signal light reflection by means of control light, comprises:

a semiconductor substrate;

a first optical waveguide for guiding the signal light and formed on the substrate;

a grating provided in the first optical waveguide and made of a monoresonant medium with a multiple quantum well structure for the ON-OFF switch control by which the signal light transmission and the signal light reflection are switched;

a second optical waveguide for guiding control light and formed on the substrate, a part of the second optical waveguide being close to the first optical waveguide to form a directional coupler for coupling the control light colinearly to the signal light and for guiding the control light to the grating together with the signal light; and a grating coupler for separating the control light and the signal light and connected to the first optical waveguide;

wherein the grating transmits the signal light when the control light is coupled while reflects the signal light when the control light is not coupled, so that the grating acts as a switch.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Example 1

Figure 7:
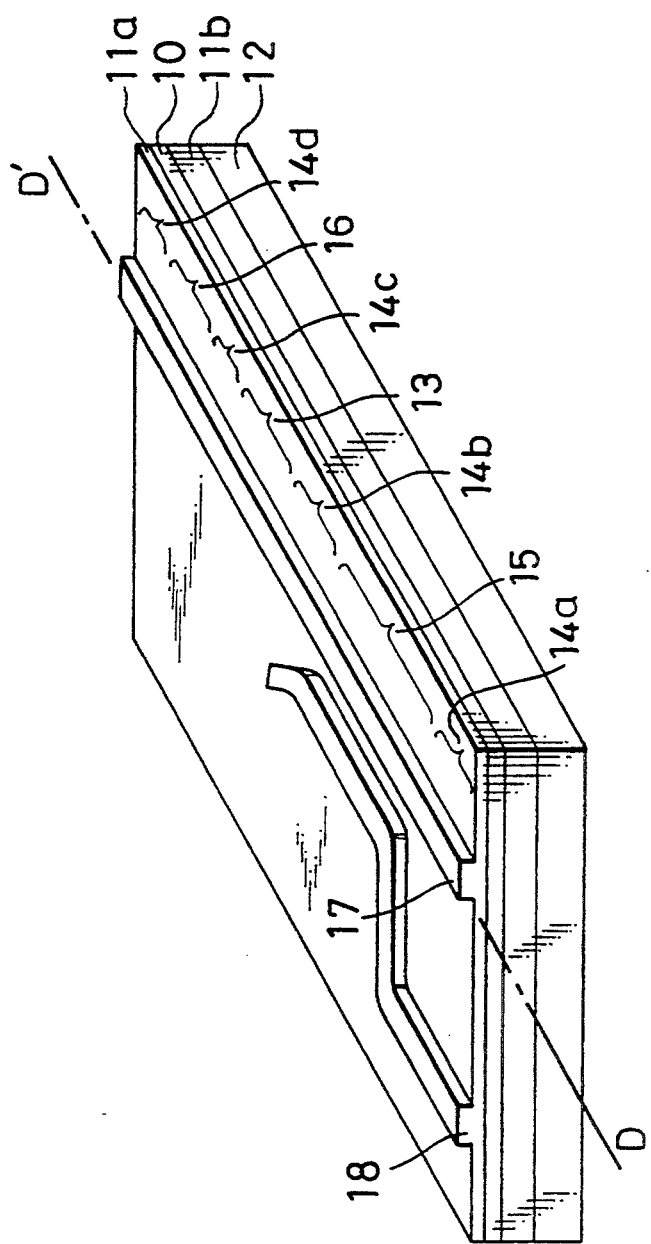
FIG. 7 is a schematic perspective view showing a first example of an optical switch in accordance with the present invention.
Figure 8:
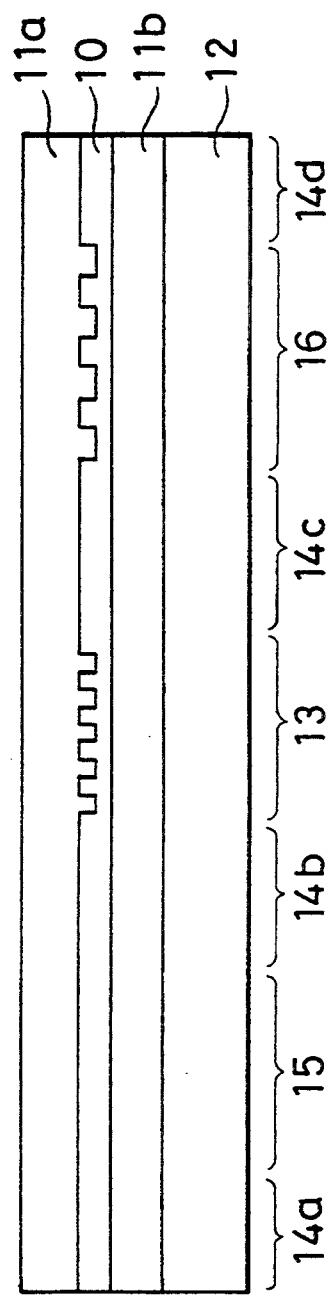
FIG. 8 is a cross sectional view along line D-D' in FIG. 7.

FIGS. 7 and 8 illustrate one of the preferred embodiments of an optical switch in accordance with the present invention. FIG. 7 is a schematic perspective view to illustrate the optical switch and FIG. 8 is a cross sectional view along line D-D' in FIG. 7.

The optical switch illustrated in these figures is formed as a structure having two ridged optical waveguides, one for the control light 18 and the other for the signal light 17, both rise on a laminated body formed by an AlGaAs cladding layer 11a, a GaAs core layer 10 and an AlGaAs cladding layer 11b on a GaAs substrate 12. The optical waveguide for signal light 17 has input-/output optical wave guide regions 14a and 14b on both ends thereof, respectively and between the two ends several different regions are formed: a grating switch region 13 for switching transmission and reflection of the signal light; input/output optical waveguide regions 14b and 14c; a directional coupler region 15 for coupling the signal light and the control light; and a grating coupler region 16 for separating the signal light and the control light. In this embodiment, the optical wave guide for the signal light is 2 μm wide.

The grating switch region 13 is formed by the conventional fabrication process. A resist pattern of the grating is formed by electron beam lithography at first, then it is etched by argon ion beam etching to fabricate the grating and then a thick cladding layer is grown by MOVPE. Following that, a pattern of the optical waveguide is formed on the cladding by $C_2H_6RIE$ to make it a ridged-type optical waveguide. In this embodiment, the pitch and the length of the grating switch region 13 are 0.24 μm and 100 μm, respectively, and thus the grating switch is formed to respond at a Bragg wavelength of 1.55 μm, corresponding to the signal light wavelength. The coupling coefficient κ is estimated to be about 300 $cm^{-1}$ or more from the GaAs core refractive index of 3.5 and the AlGaAs cladding layer refractive index of 3.3. A maximum reflectance of over 99% can be achieved by making the grating of 100 μm in length.

Because the incident signal light is at a wavelength of 1.55 μm, the GaAs core only absorbs a negligible quantity of the signal light and thus the input/output optical waveguide region can be formed by the same GaAs layer as used in the grating region.

The following description will explain how incident light between two different waveguides being provided in parallel and adjacently, is propagated.

A beam of light input from a facet of the optical waveguide is all reflected by a boundary between the core layer and the cladding layer and the reflected light is closed in and propagates through the core layer. The incident light is propagated through the core layer but it is not free to take every propagation angle. The incident light takes constant propagation angles which are disconnected from one angle to another and which satisfy a prescribed condition of the phase matching in accordance with a structure of the waveguide (a core width, a refractive index, and a difference of comparative indices) and with a wavelength λ of the light from a light source (the wave number κ is defined as k=2π/λ). A shape of the optical waveform for satisfying the prescribed condition of the phase matching is defined as a "mode". An electric field in the waveguide can be expressed by the sum of odd modes and even modes. When two waveguides are brought close to each other, the odd modes and the even modes in each waveguide are coupled between each other. Coupling characteristics of the directional coupler is dependent on an interference between the odd modes and the even modes in the waveguide. In the coupling region where two waveguides are brought close to each other, odd and even modes are excited in phase. In this example, $E_e(X)$ and $\beta_e$ indicate an electric field distribution and a propagation constant of an even mode, respectively, while $E_o(X)$ and $\beta_o$ indicates an electric field distribution and a propagation constant of an odd mode, respectively. When a beam of light travels into one waveguide (referred as a core I) at an input end z=0, odd and even modes having equal electronic field amplitudes are excited with equal phases at this point. The electric field at the input end Z=0 is given by $$|E(X,0)| = |E_e(X) + E_o(X)| = E_1(X)$$

wherein, $E_1(X)$ indicates a localized electric field distribution in the core I.

Then, the electric field at a distance z is given by $$|E(X,Z)| = |E_e(X) + E_o(X) \exp[j(\beta_e - \beta_o)Z]|$$

As these mode propagate in the coupler region, a phase shift between the two modes occurs. The phase shift is given by $$P = (\beta_e - \beta_o) \cdot Z$$

When the two modes traverse a distance $$L = \pi/(\beta_e - \beta_o)$$

the phase shift takes a value of $\pi$ and at this point $$|E(X,Z)| = |E_e(X) + E_o(X)| = E_2(X)$$

wherein, $E_2(X)$ indicates a localized electric field distribution in another waveguide (referred as a core II). It means that the composite electric field distribution of the odd and even modes coincide with an electric field distribution of the waveguiding mode in the core II outside of the coupler region. That is, the light propagates from the core I to the core II and the light is launched into the core II without any attenuation when a coupling length takes a value of L (i.e., a complete coupling length). The complete coupling length L depends on the propagation constant, so that the complete coupling length varies with a wavelength of waveguiding light.

In the situation for complete coupling length $L_1$ 1 for the waveguiding light at a wavelength of $\lambda_1$ and the complete coupling length $L_2$ for the waveguiding light at a wavelength $\lambda_2$, the coupler region 15 of FIG. 7 takes a coupling length Lc to give the equation:

$$L_c = (2n+1)L_1 (n=0,1,2,\ldots)$$

The incident light at a wavelength of $\lambda_1$ from the waveguide 18 travels from one waveguide to another over and over again and is finally coupled in the waveguide 17. The coupling length $L_c$ is also given by the equation:

$$L_c = 2nL_2 (n=1,2,\ldots)$$

Therefore the incident light at a wavelength of $\lambda_2$ from the waveguide 17 travels from one waveguide to another over and over again and is finally coupled to the waveguide 17. Consequently, these beams $\lambda_1$, $\lambda_2$ are coupled within the waveguide 17 and the region 15 acts as a wavelength coupler.

In the situation that is control light at a wavelength of $\lambda_1 = 1.06$ μm is provided into waveguide 18 while a signal light at a wavelength of $\lambda_2 = 1.55$ μm is provided into waveguide 17, the incident control light and the incident signal light are coupled within the waveguide 17 and they travel into the switch region through the same optical path when the coupler region 15 has a coupler length Lc which is given by $$L_c = 3L_1 = 2L_2 = 1.8 \text{ mm}$$

When the signal light at a wavelength of 1.55 μm is input in the switching region 13, it is reflected by the grating. In the case of that the control light at a wavelength of 1.06 μm is inputted and is passed through the same path as that of the signal light, the incident control light passes through the GaAs and there is no excitation of the carriers in the GaAs core. In this case, the refractive index of the GaAs core layer may be changed by the electric field of the control light and the refractive index of GaAs may be changed (i.e., the optical Kerr effect). The optical Kerr effect is proportional to the square of the optical field. Therefore, the refractive index is varied from $n_0$ to $n_0 + n_2|E|^2$ by the optical electric field E and in this case $n_2$ is the Kerr constant (nonlinear refractive index of the Kerr effect). Each material shows its own particular value of the Kerr constant, but such a value will be improved about 1.5 times by constructing the material as a multiple quantum well (MQW) structure. In this example, the nonlinear refractive index $n_2$ of the Kerr effect takes a value in the order of $10^{-10}$ cm$^2$/W.

The difference Δn required for shifting the Bragg wavelength for Δλ=30 Å is about 0.007, a spot size of a beam of the waveguiding light in the waveguide (i.e., a mode size corresponding to the extent of the optical magnetic field) is about 3 μm$^2$.

The relation between a value of the difference $\Delta n_{sw}$ of the refractive index required for the switching operation and a value of the peak power density $I_0$ is given by:

$$I_0 = \Delta n_{sw}/n_2 (W/cm^2)$$

and the control light peak power is calculated by the equation:

$$I_0 \times [\text{mode size}]$$

In this example, therefore, the control light peak power is calculated by the above equations and takes a value of 2.1 W.

By injecting the control light with a peak power of 2.1 W, the signal light passes through the grating 13 as a result of shifting a band of the Bragg wavelength to a shorter one. In this case, the switching time is about 1 picoseconds. It is a very short time compared with the conventional switch because it does not depend on the carrier effect.

At the time when the signal light passes through the grating 13, the control light also passes through the grating 13, and then both light travel into the grating coupler 16.

Figure 9A:
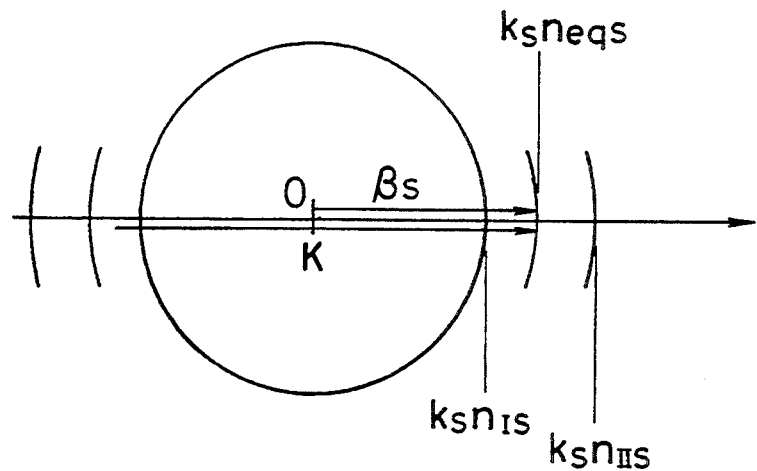
FIG. 9A is a vector diagram of a grating coupler for incident signal light.
Figure 9B:
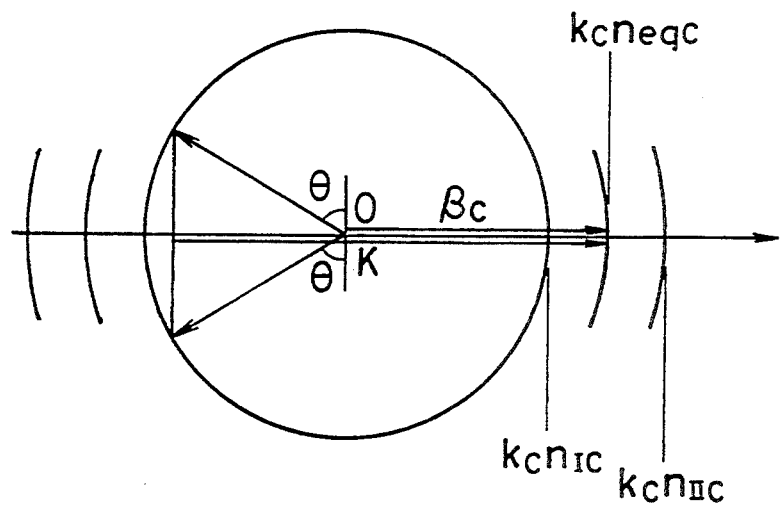
FIG. 9B is a vector diagram of a grating coupler for incident control light.

An operation of the grating coupler will be explained by the following description with reference to FIGS. 9A and 9B. FIG. 9A is a vector diagram of the grating coupler for the signal light, while FIG. 9B is a vector diagram of the grating coupler for the control light. In these figures, $\kappa = 2\pi/\lambda$ is a wave number in a vacuum, $n_I$ is a refractive index of the cladding layer, $n_{II}$ is a refractive index of the core layer, $n_{eq}$ is an equivalent refractive index of the waveguide, $K = 2\pi/\Lambda$ is a grating vector, $\Lambda$ is a grating period(pitch). In addition, "s" means a signal light and "c" means a control light.

In the case of traveling waveguiding light with a propagation constant $\beta = kn_{eq}$ into the grating, a space harmonic wave is generated and it shows a propagation constant $\beta_q$ to give the equation:

$$\beta q = \beta + q \cdot K (q = 0, \pm 1, \pm 2, \ldots)$$

Where q is an order which is responsible for the phase matching operation of the grating.

When the order q takes a certain value which satisfies the inequality $$|\beta_q| < k \cdot n_I$$

the space harmonic wave is radiated from the core layer in up and down directions at radiation angle $\theta$ defined by the equation $$n_{IS} \cdot \sin \theta = \beta_q = k \cdot n_{eq} + q \cdot K$$

When the value $K = 2\pi/\Lambda$ satisfies the inequality $$k_s \cdot n_{Is} < |\beta_q| = |\beta - K| < k_c \cdot n_{IS}$$

therefore, the signal light is propagated through the grating without any affect and, at the same time, the control light radiates from the grating. Hence the signal light is perfectly isolated from the control light.

According to the construction of the optical switch of the present invention, it is noted that the isolated signal light can be further introduced into another optical switch and a matrix switch can be provided by connecting a plurality of the optical switches.

The optical switch described above uses the directional coupler as a means for coupling the control light and the signal light and also uses the grating coupler as a means for separating the control light and the signal light, but the present invention is not limited to such construction. It is noteworthy that the grating couplers can be used for both separating and coupling processes, or the grating coupler can be only used for the coupling process. When the grating coupler is used for the coupling process, for example, the control light should be passed into the switch at the angle $\theta$ as described above.

It should be concluded that, from what has been described above, that the optical switch according to the present invention shows no dissipative absorption of the incident light in the switching region because the switching is performed at a non-resonant region. The incident light is only attenuated in the switching region by the scattering loss which is estimated to under 0.1 dB.

In this example, a GaAs bulk is used as a core material, but the core material is not limited to GaAs. With a AlGaAs semiconductor, a GaAs based semiconductor having a structure of GaAs/AlGaAs multiple quantum well or AlGaAs/AlGaAs multiple quantum well, or the like, a marked improvement of the switching operation can be expected. In addition, a wide gap II–VI grouped compound semiconductor such as CdTe, ZnTe, ZnS or the like, can be also used as a core material. Furthermore, InP compound semiconductor having a bandgap wavelength shorter than that of a signal wavelength or a control light wavelength, such as InP, InGaAsP, InGaAlAs or multiple quantum wells thereof, or the like, can be used. Still further, a glass material such as a semiconductor-doped glass or the like, or an organic material can be used.

Constructing the optical switch of the present example by a medium which is responsible for switching the transmission and reflection of the waveguiding signal light and in which an absorption spectrum is nonresonant with respect to both control and signal light, it follows that:

(i) a time required for the switching OFF operation is reduced sharply compared with that of the conventional switch;

(ii) dissipative absorption of the incident signal light is reduced sharply;

(iii) production costs can be reduced because the input/output waveguide is constructed by the same semiconductor material used for the switching region;

(iv) the switching power is reduced;

(v) a high cost efficiency and a stable switching operation can be achieved because there is no need to use another optical element; and (iv) the polarizing conditions of both signal and control light can be optionally selected.

Example 2

Figure 10:
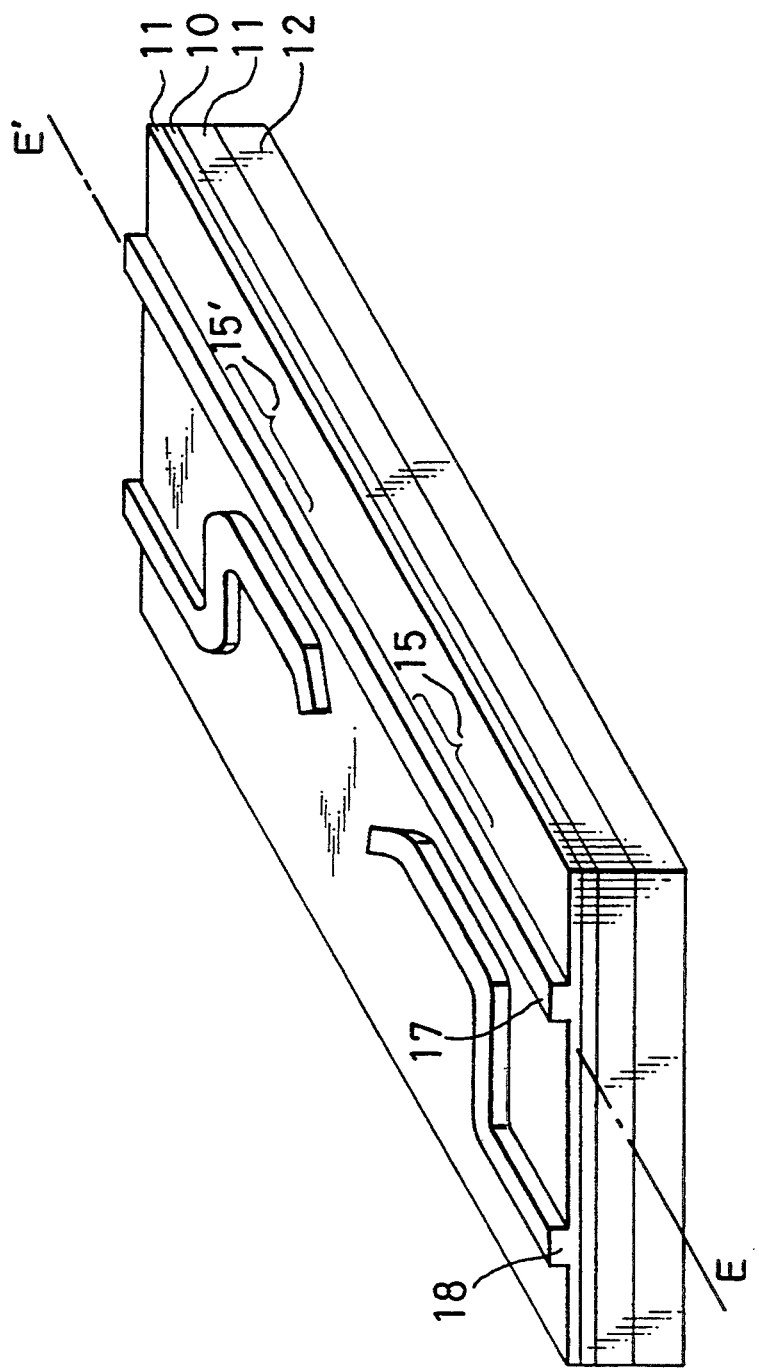
FIG. 10 is a schematic perspective view showing a second example of the optical switch in accordance with the present invention.
Figure 11:
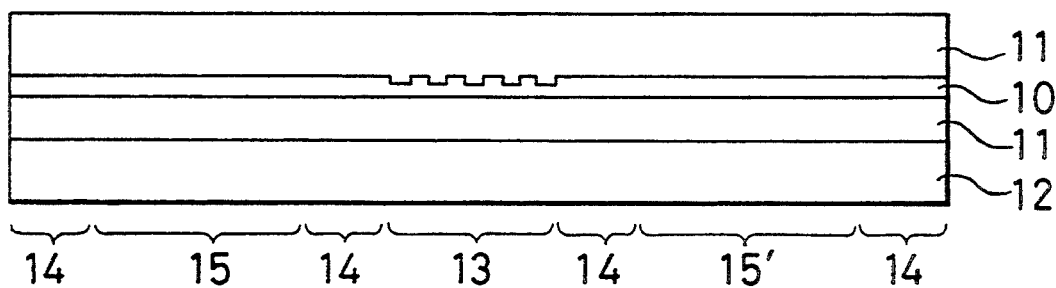
FIG. 11 is a cross sectional view along line E-E' in FIG. 10.

FIGS. 10 and 11 illustrate another preferred embodiment of the optical switch in accordance with the present invention. FIG. 10 is a schematic perspective view illustrating the optical switch and FIG. 11 is a cross sectional view of the optical switch taken at a plane E-E' in FIG. 10.

The structure Of the optical switch is the same as one of the first embodiment except that directional couplers 15, 15' are used for the coupling and the separating of signal light and control light, respectively.

Example 3

Figure 13:
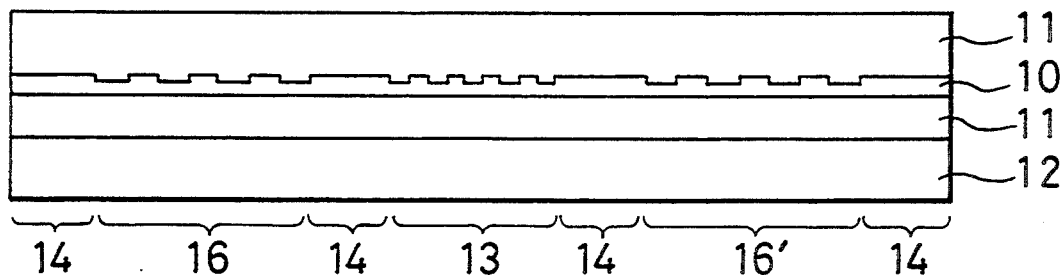
FIG. 13 is a cross-sectional view along line F-F' in FIG. 12.
Figure 12:
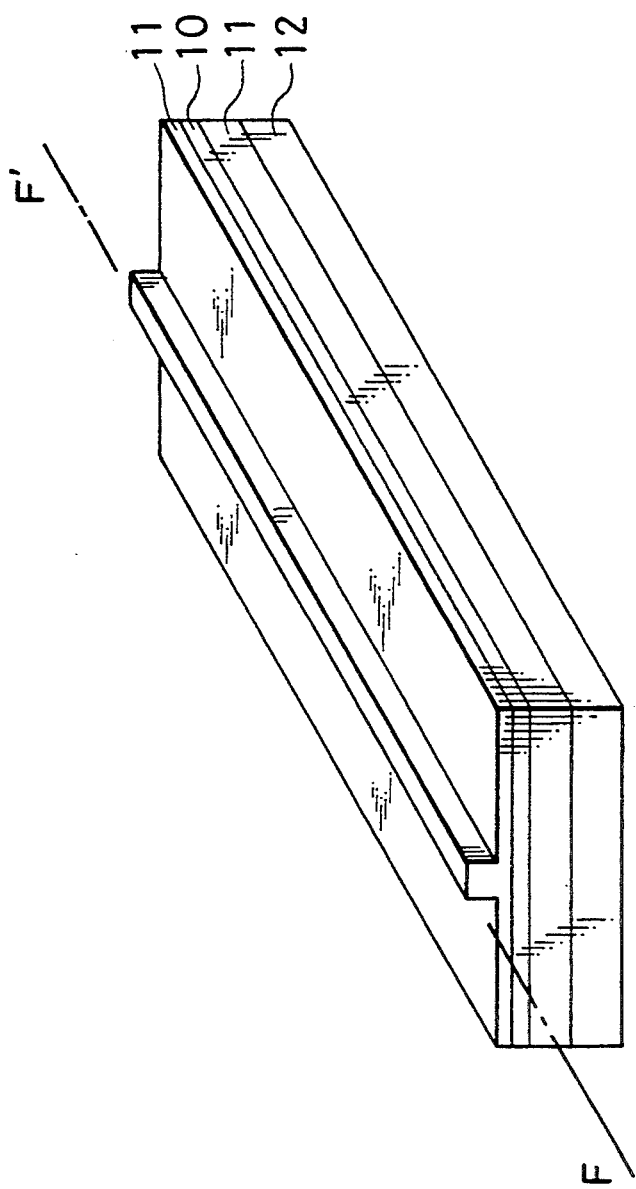
FIG. 12 is a schematic perspective view showing a third example of the optical switch in accordance with the present invention.

FIGS. 12 and 13 illustrate a third preferred embodiment of the optical switch in accordance with the present invention. FIG. 12 is a schematic prespective view illustrating the optical switch and FIG. 13 is a cross sectional view of the optical switch taken at a plane E-E' in FIG. 10. The structure of the optical switch the same as one of the first embodiment except that only one ridged portion is formed on the laminate body and grating couplers 16, 16' are used for the coupling and the separating of signal light and control light, respectively.

Example 4

Figure 1:
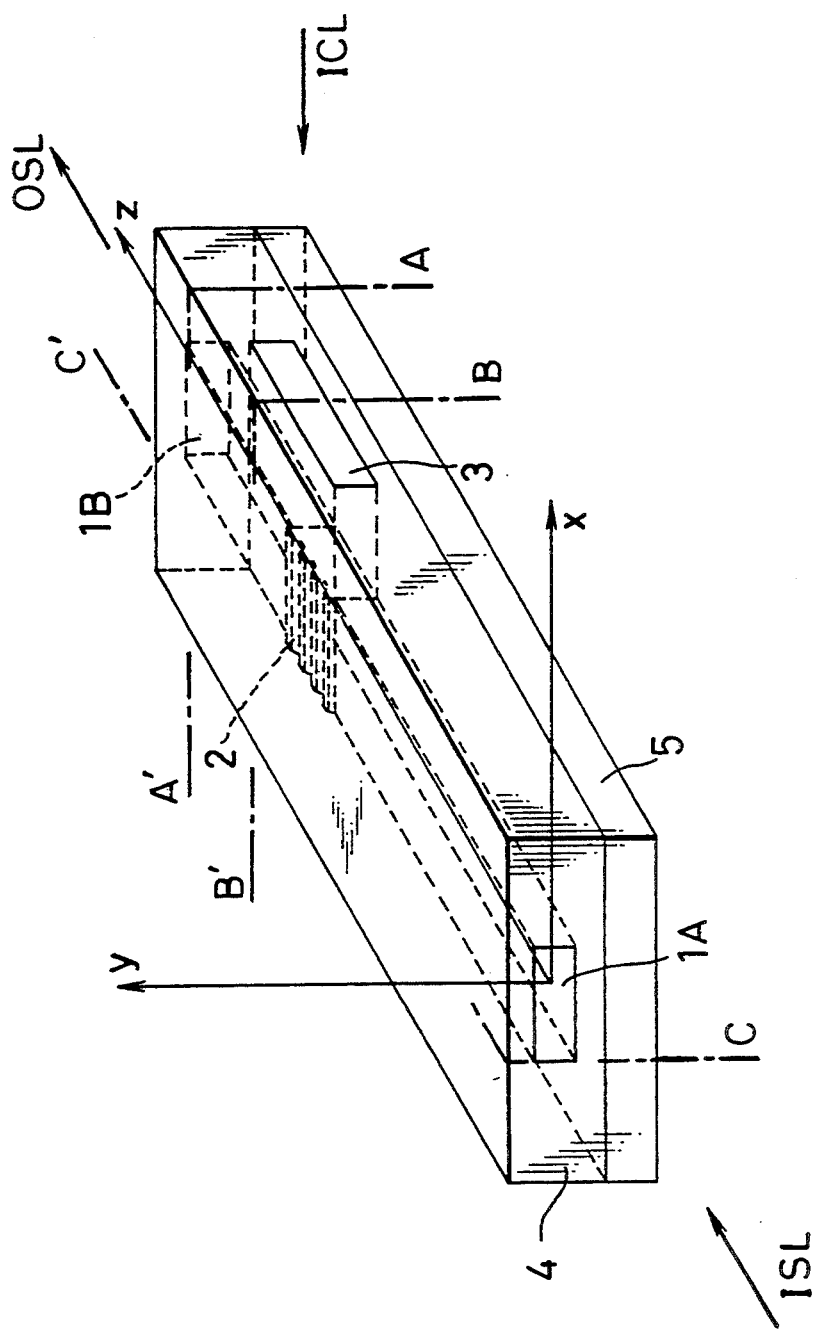
FIG. 1 is a schematic perspective view showing a conventional optical switch.
Figure 2:
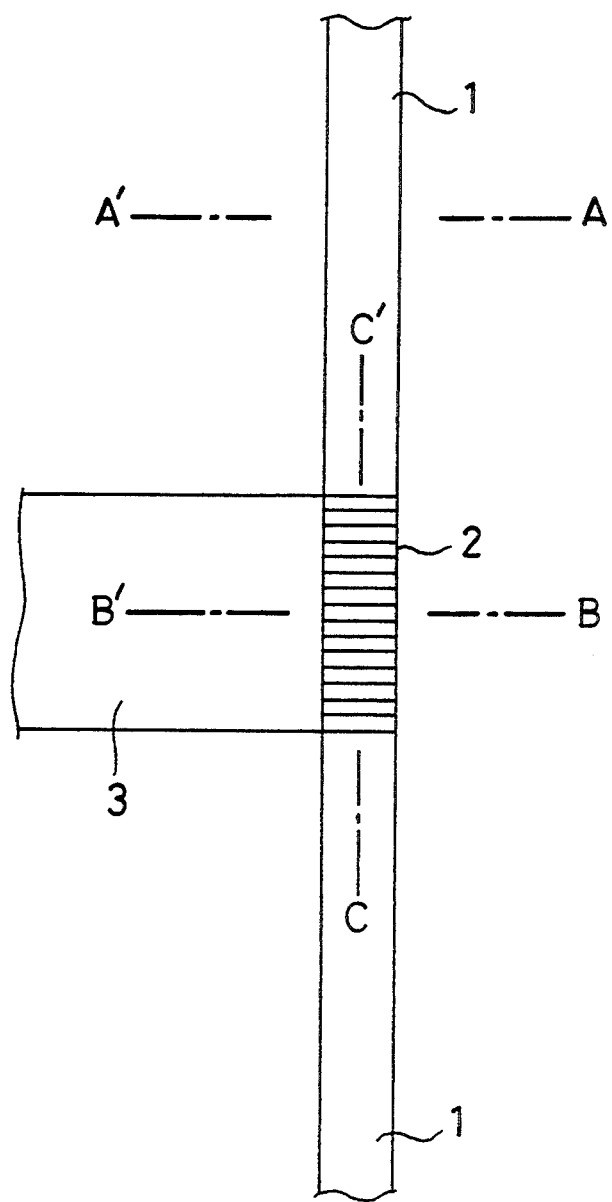
FIG. 2 is a plan view of the optical switch in FIG. 1.
Figure 3:
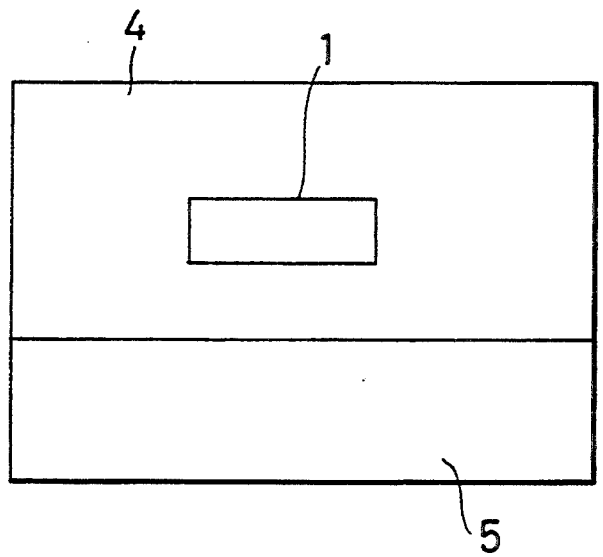
FIG. 3 is a cross sectional view along line A-A' in FIGS. 1 and 2.
Figure 4:
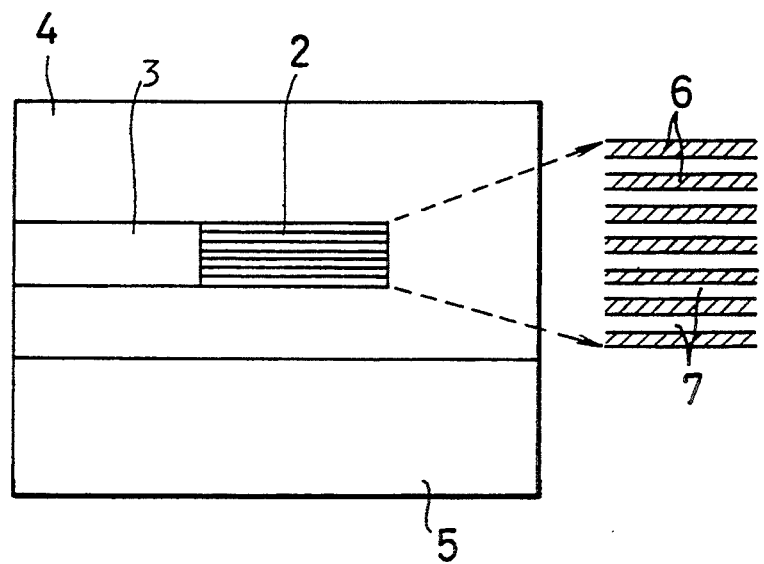
FIG. 4 is a cross sectional view along line B-B' in FIGS. 1 and 2.
Figure 5:
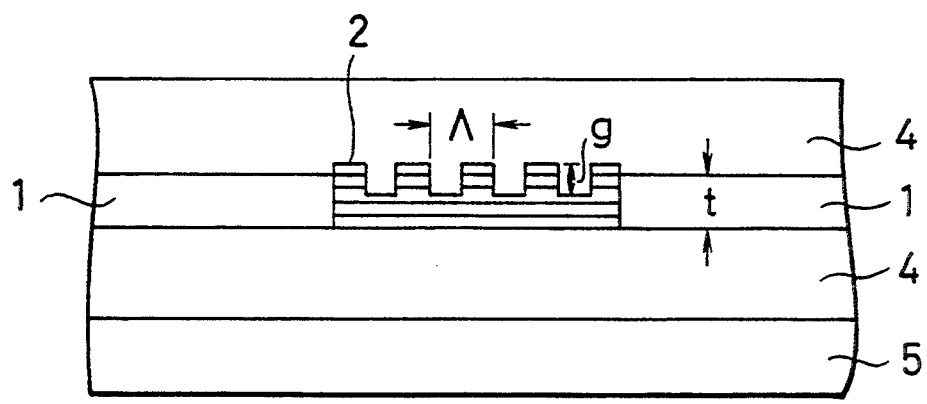
FIG. 5 is a cross sectional view along line C-C' in FIGS. 1 and 2.
Figure 6:
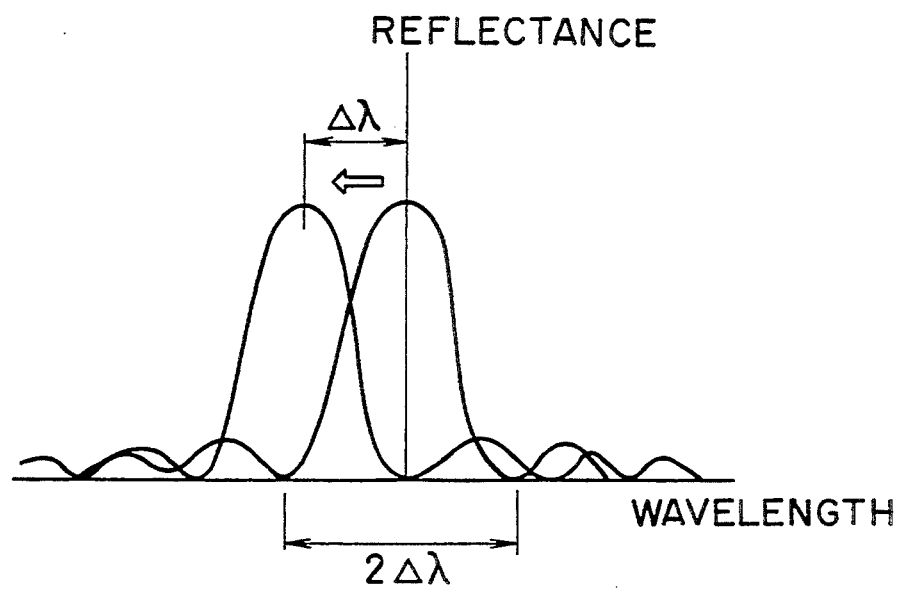
FIG. 6 is a graph showing calculated wavelength-reflectance characteristics for explaining a work function of a grating switch region of the conventional optical switch.
Figure 14:
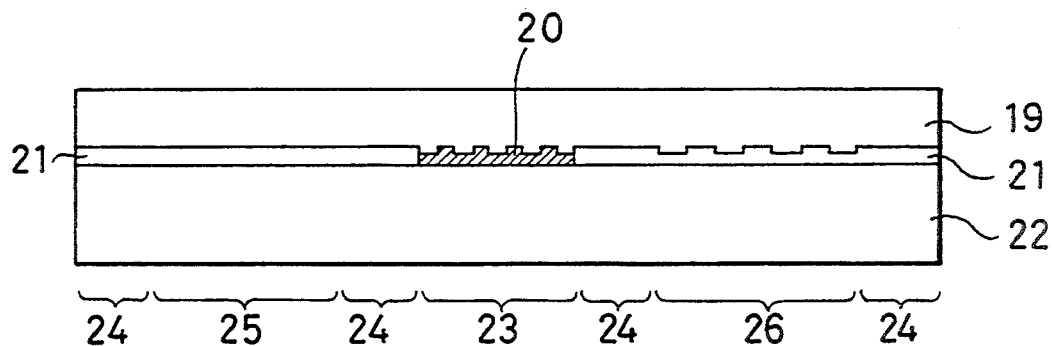
FIG. 14 is a cross sectional view of a fourth example of the optical switch in accordance with the present invention.

FIG. 14 illustrates a forth preferred embodiment of the optical switch in accordance with the present invention and the figure is a cross sectional view of an optical switch which is the same as one taken at a plane D-D' in FIG. 1 except that the grating switch region is made of a material which absorbs a control light.

In the figure, reference numeral 19 denotes InP cladding region, 20 denotes a multiple quantum well structure (a laminate structure of alternate InGaAs quantum well layers and InP barrier layers), 21 denotes an In- GaAsP waveguide layer, 22 denotes a InP substrate, 23 denotes a grating switch region for switching the signal light transmission, 24 denotes an input/output optical waveguide region, 25 denotes a directional coupler region, and 26 denotes a grating coupler region. Two couplers 25, 26 act as the same way as that of the example 1 except that in the case of the example 4 the incident control light is absorbed in the InGaAs/InP MQW structure through the grating switch region. Such absorption leads to the carrier generation, resulting in that the refractive index is shifted by the carrier effects, such as band-filling, plasma effect, and the like, and the switching occurs. According to the conventional optical switch, generated carriers disappear mainly by the recombination effect, and little by the diffusion effect. According to the present example, on the other hand, the carriers may be closed into an area with 2 μm wide corresponding to a width of the waveguide. The diffusion effect becomes a dominant effect land the switching time is one digit off, or order of magnitude compared with the conventional switch.

Example 5

Figure 15:
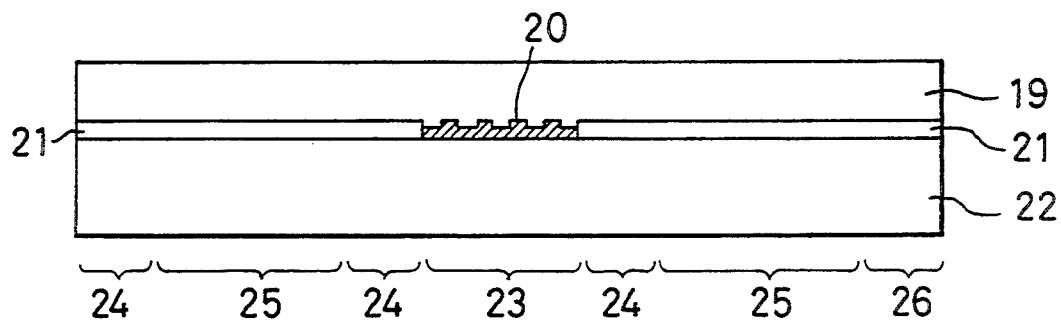
FIG. 15 is a cross sectional view of a fifth example of the optical switch in accordance with the present invention.

FIG. 15 illustrates a fifth preferred embodiment of the optical switch in accordance with the present invention and the figure is a cross sectional view of the optical switch which is the same as the switch taken at a plane E-E' in FIG. 10 except that the grating switch region is made of a material which absorbs control light.

Example 6

Figure 16:
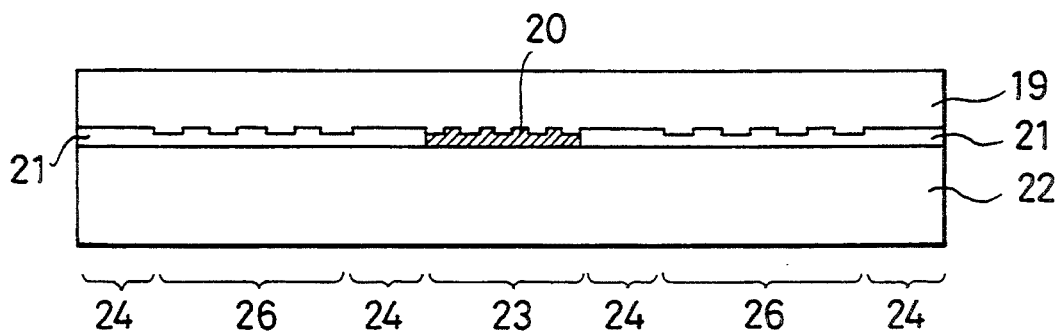
FIG. 16 is a cross sectional view of a sixth example of the optical switch in accordance with the present invention.

FIG. 16 illustrates a sixth preferred embodiment of the optical switch in accordance with the present invention and the figure is a cross sectional view of the optical switch which is the same as the switch taken at a plane F-F' in FIG. 12 except that the grating switch region is made of a material which absorbs control light.

Example 7

Figure 17:
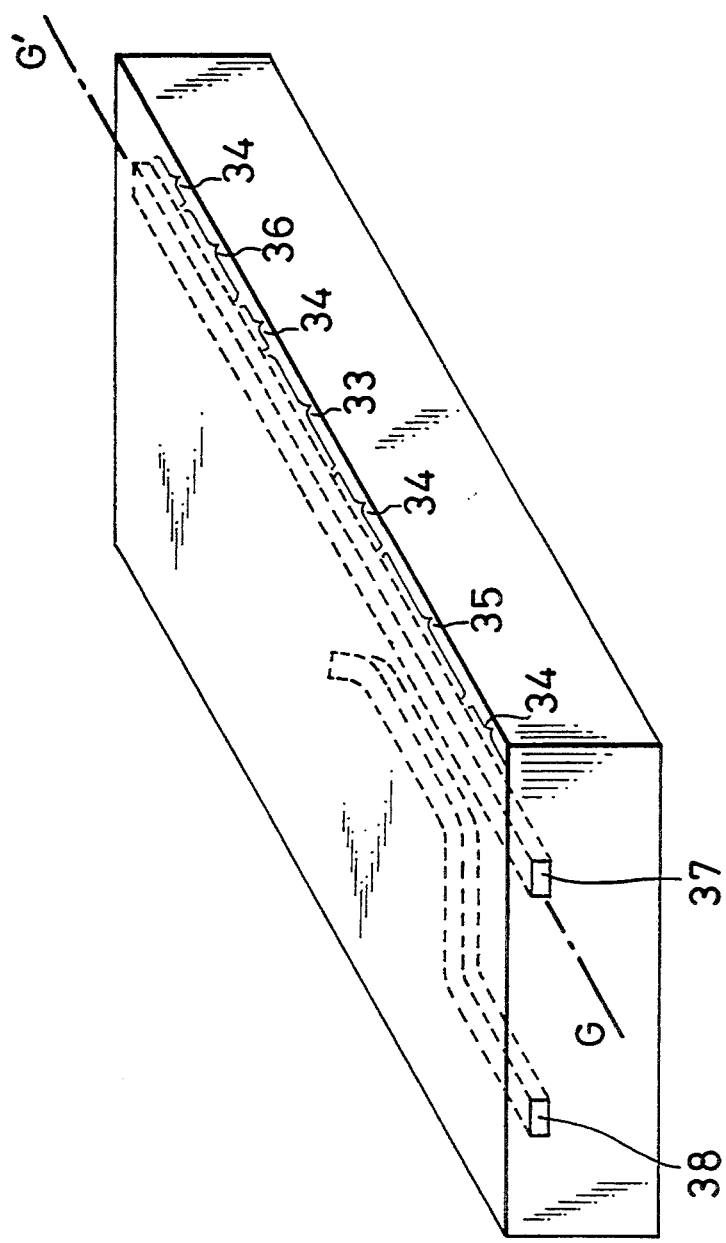
FIG. 17 is a schematic perspective view showing a seventh example of the optical switch in accordance with the present invention.
Figure 18:
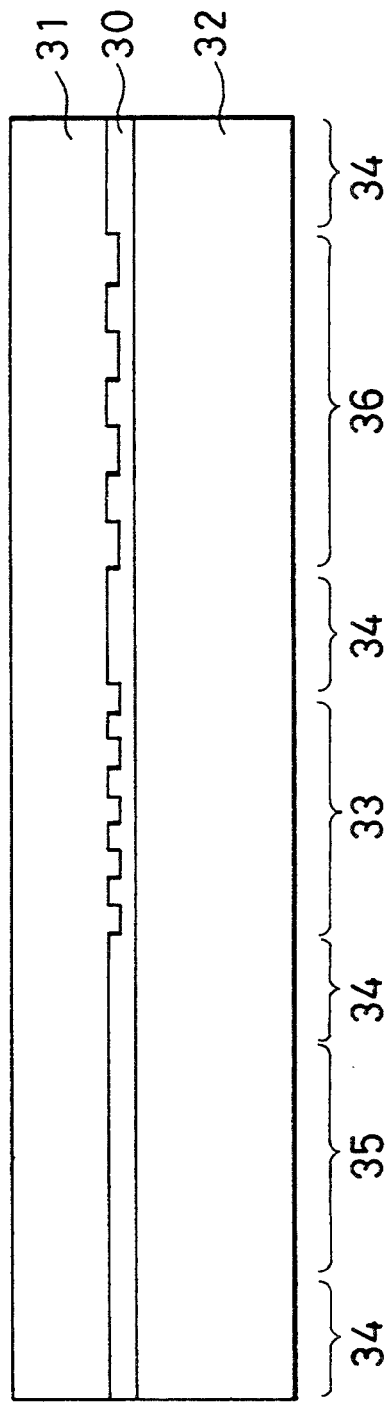
FIG. 18 is a cross sectional view along line G-G' in FIG. 17.

FIGS. 17 and 18 illustrate a seventh preferred embodiment of the optical switch in accordance with the present invention. FIG. 17 is a schematic perspective view illustrating the optical switch and FIG. 18 is a cross sectional view of the optical switch taken at a plane G-G' in FIG. 17. The optical switch of this embodiment is the same as the switch of example 1, except that the waveguides have the embedded structure.

In these figures, numeral reference 30 denotes a InGaAsP core ($\lambda_g < \lambda_s$), 31 denotes an InP cladding layer, 32 denotes an InP substrate, 33 denotes a grating switch region, 34 denotes an input/output optical waveguide, 35 denotes a directional coupler, 36 denotes a grating coupler, 37 denotes a signal light waveguide, and 38 denotes a control light optical waveguide The grating switch region is formed by the conventional fabrication process, i.e., a resist pattern of the grating is formed by electron beam lithography at first, and then a semiconductor grating is fabricated using Ar ion beam etching. After embedding the grating in a cladding layer by MOVPE, a waveguide pattern is formed on the cladding and the core layer by $C_2H_6$ RIE. And finally, all waveguides are embedded in the cladding layer by MOVPE.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. An optical grating switch for ON-OFF switch control of a signal light transmission and a signal light-reflection under control of a control light, comprising:
   an input optical waveguide region for receiving the signal light, the signal light having a first wavelength;
   a coupler region, coupled to the input optical waveguide region, for coupling a control light colinearly to the signal light, the control light having a second wave-length, the second wavelength being different from the first wavelength;
   a switching region, coupled to the coupler region, for switching between a transmission and a reflection of the signal light, the switching region being responsive to the control light which is colinearly coupled to the signal light;
   a separator region, coupled to the switching region, for separating the signal light and the control light based on the respective wavelengths of the signal light and the control light; and
   an output region, coupled to the separator region, for outputting the signal light.

2. An optical switch as claimed in claim 1, wherein said switch region is a grating switch of a nonresonant medium without an ability of absorbing said control light.

3. An optical switch as claimed in claim 2, wherein said nonresonant medium is a semiconductor selected from a group consisting of III-V group compounds and II-VI group compounds.

4. An optical switch as claimed in claim 3, wherein said semiconductor is selected from a group consisting of GaAs series semiconductors and InP series semiconductors.

5. An optical switch as claimed in claim 1, wherein said switch region is a grating switch composed of a medium with an ability of absorbing said control light.

6. An optical switch as claimed in claim 5, wherein said medium with an ability of absorbing said control light is selected from a group consisting of III-V group compound semiconductor multiple quantum well structures and II-VI group compound semiconductor multiple quantum well structures.

7. An optical switch as claimed in claim 1, wherein at least one of said coupler region and said separator region is a directional coupler.

8. An optical switch as claimed in claim 1, wherein at least one of said coupler region and said separator region is a grating coupler.

9. An optical switch as claimed in claim 1, wherein said switch region, said input/output optical waveguide region, said coupler region and said separator region are formed in a structure of a ridged waveguide formed on a same substrate, respectively.

10. An optical switch as claimed in claim 1, wherein said switch region, said input/output optical waveguide region, said coupler region and said separator region are formed in a structure of a embedded waveguide formed on a same substrate, respectively.

11. An optical switch for ON-OFF switch control of a signal light transmission and a signal light reflection by means of control light, comprising:
   a semiconductor substrate;
   a first optical waveguide for guiding said signal light and formed on said substrate;
   a grating provided in said first optical waveguide and made of a multiple quantum well structure for said ON-OFF switch control by which said signal light transmission and said signal light reflection are switched;

a second optical waveguide for guiding control light and formed on said substrate, a part of said second optical waveguide being close to said first optical waveguide to form a directional coupler for coupling said control light colinearly to said signal light and for guiding said control light to said grating together with said signal light; and a grating coupler for separating said control light and said signal light and connected to said first optical waveguide;

wherein said grating transmits said signal light when said control light is coupled while reflecting said signal light when said control light is not coupled, so that said grating acts as a switch.

12. An optical grating switch for ON-OFF switch control of a signal light transmission and a signal light-reflection by means of control light comprising:

a switching region for the ON-OFF switch control by which the signal light transmission and the signal light reflection are switched;

an input/output optical waveguide region for guiding the signal light to the switching region and for outputting the signal light from the switching region;

a coupler region for coupling the control light colinearly to the signal light and for guiding the control light to the switching region together with the signal light;

a separator region for separating the signal light and the control light;

another switching region for switching the signal light;

another input/output optical waveguide region connected to the separator region and the another switching region; and another coupler region for coupling another control light colinearly to the signal light and for guiding the another control light to the another switching region together with the signal light and another separator region for separating the signal light and the another control light.

* * * * *